United States Patent
Kato

[11] Patent Number: 5,950,713
[45] Date of Patent: Sep. 14, 1999

[54] CONNECTOR FOR HEAT EXCHANGER

[75] Inventor: Soichi Kato, Kohnan-machi, Japan

[73] Assignee: Zexel Corporation, Tokyo, Japan

[21] Appl. No.: 08/969,468

[22] Filed: Nov. 13, 1997

[30] Foreign Application Priority Data

Nov. 13, 1996 [JP] Japan .................................. 8-301488

[51] Int. Cl.⁶ .................................................. B23K 1/20
[52] U.S. Cl. ........................... 165/76; 228/183; 228/223
[58] Field of Search ..................... 165/76, 178; 228/207, 228/214, 215, 223, 183

[56] References Cited

U.S. PATENT DOCUMENTS

| | | | |
|---|---|---|---|
| 3,339,008 | 8/1967 | MacArthur et al. | 228/215 X |
| 3,902,189 | 8/1975 | Simpson | 228/215 X |
| 4,208,563 | 6/1980 | Fratzreb, Sr. et al. | 228/215 X |
| 5,209,292 | 5/1993 | Arneson et al. | 165/176 |
| 5,363,910 | 11/1994 | Baba et al. | 165/153 |
| 5,477,919 | 12/1995 | Karube | 165/176 |
| 5,685,364 | 11/1997 | Harris | 165/67 |

OTHER PUBLICATIONS

"Minature Card/PC Card Adapter", Mitsubishi Plastics, Sep. 10, 1996.

*Primary Examiner*—Allen Flanigan
*Attorney, Agent, or Firm*—Kanesaka & Takeuchi

[57] ABSTRACT

In a heat exchanger having a plurality of tubes 2 alternately laminated with fins 3, header pipes 4 connected to and in communication with both ends of the laminated tubes, inlet and outlet connectors 8 connected to the header pipes to supply and receive a heat exchanging medium to and from an external equipment, and the heat exchanging medium meanders a plurality of times between the inlet and outlet connectors; a groove 15 is formed in one of the inlet and outlet connectors 8, on the rim of the piping connecting face of the connector having its piping connecting face 11 facing downward with respect to the vertical line during brazing, so as to prevent the flux from entering into the inside of the piping connecting face from the outside of the piping connecting face.

3 Claims, 9 Drawing Sheets

FIG. 10 (1)
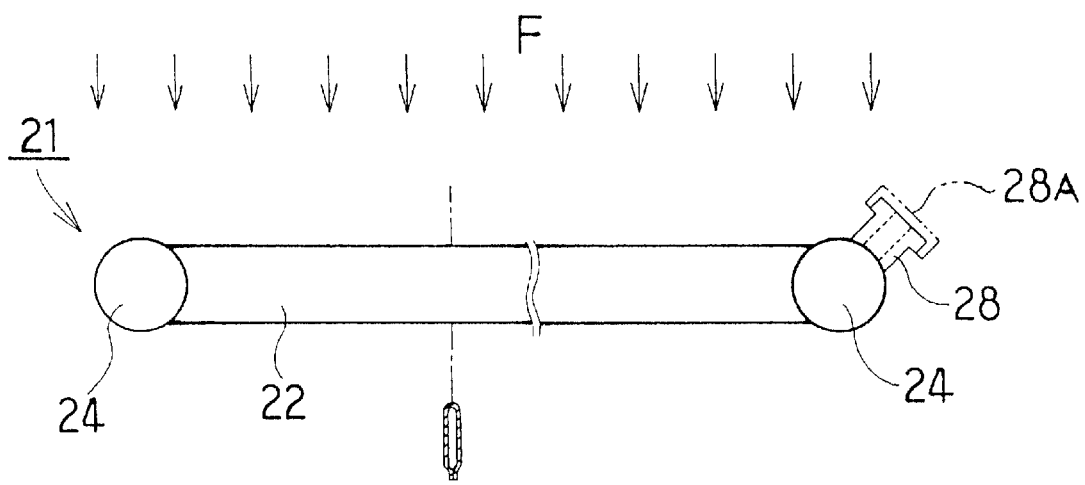
FIG. 10 (2)
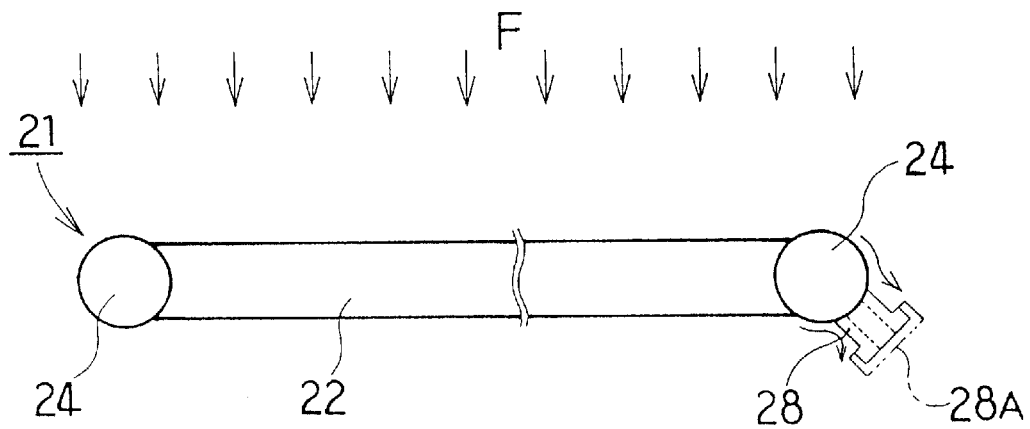

CONNECTOR FOR HEAT EXCHANGER

BACKGROUND OF THE INVENTION

1. Field of the Invention

The present invention relates to a heat exchanger to which a connector for connecting an external piping to header pipes is integrally fixed by brazing to improve brazing work and to keep an appropriate piping connecting face, thereby improving reliability in connecting the connector to the piping.

2. Description of the Related Art

Generally, a parallel flow type heat exchanger has a plurality of tubes and fins alternately laminated, and header pipes are connected to and in communication with both ends of the laminated tubes. Top and bottom openings of each header pipe are closed by a blind cap, and partitions are located at required positions in the header pipes to divide the inside of the header pipes so that a heat exchanging medium meanders to flow a plurality of times between inlet and outlet connectors formed on the header pipes.

Such a heat exchanger is produced by temporarily assembling respective parts and integrally brazing them in a furnace.

Specifically, at least core portions such as flat tubes and header pipes, as the main portion for heat exchanging, are temporarily assembled. The temporarily assembled heat exchanger is entirely sprayed with a flux for brazing, placed in a furnace such as an electric furnace, and heated so as to be brazed into one body.

Respective steps of the above procedure are automated and arranged to co-operate by coupling with one another so as to produce a number of heat exchangers continuously.

From upstream to downstream of a conveying means using a belt conveyor, a temporally assembling step, a flux shower step, and an in-furnace integral brazing step are disposed sequentially. A temporarily assembled heat exchanger is placed in a stable state on the belt conveyor so as to be carried to the next step.

The flux shower step uses a suspension of flux or a solution prepared by mixing water and a low concentration of flux and sprays the solution in a mist state (spray) from above towards the entire body of the heat exchanger.

And, the flux shower is adjusted to a required minimum amount to cover the temporarily assembled heat exchanger entirely, thereby reducing the maintenance work on the production facilities.

If a large amount of flux is used, the flux drips from the heat exchanger to the conveyor belt below, and the drops harden to contaminate the surface of the heat exchanger and the belt conveyor. By spraying a minimum amount of flux in a low concentration, such contamination is minimized.

It has been known recently to reduce costs by using brazing on connectors which supply and receive a heat exchanging medium to and from an external apparatus, to header pipes (e.g., Japanese patent application Kokai No. 6-281387). Such connectors are often made large enough to serve as mounting brackets for the heat exchanger, with threaded fastening holes.

But, in the flux shower step described above, this connector has the flux adhered in clusters on its surface for connection to the piping and the surface smoothness is degraded, so that the connector and the external piping are not closely connected to each other, leaking the heat exchanging medium.

In view of the above, as shown in FIG. 10 (1), when a heat exchanger 21, which is temporarily assembled by alternately laminating a plurality of tubes 22 with fins and connecting header pipes 24, 24 to and in communication with both ends of the laminated tubes, is laid down in a brazing posture and a flux is sprayed from above (indicated by arrows F in the drawing), a connector 28 is temporarily covered with a cap-shaped protecting member 28A to cover at least the entire piping connecting face, so that the flux does not adhere to the piping connecting face.

Besides, in the case of a heat exchanger for vehicles, a connector is disposed in a direction along both sides of the heat exchanger, or a connector is disposed in a different direction because of a space for mounting the heat exchanger or an arrangement of piping in the vehicle. For example, the heat exchanger is produced with a connector disposed to face downward when the heat exchanger is in the brazing posture.

However, in the case of the connector of the above-described conventional heat exchanger, the connector is disposed to face downward when placed in the brazing posture, and the flux is not directly showered to the piping connecting face of the connector. But, regardless of the protective cap, the flux dropping from other parts of the heat exchanger may reach the piping connecting face to contaminate it.

Specifically, as shown in FIG. 10(2), even if the cap-shaped protective member 28A is put on the connector 28, the flux permeates into the gap of the piping connection faces between the protective member 28A and the connector 28 to contaminate the piping connecting faces. Especially, since an excess portion of the sprayed flux tends to flow down along the surface rather than dropping directly from the sprayed location, it is highly probable that the flux accumulates on the connecting surface of the connector 28 directed downward.

And the protective member may have higher airtightness and higher adhesion or a shape to entirely cover the connector. But, the protective member cannot be attached and removed easily and must be designed for each connector having a different shape, causing a disadvantage in view of costs.

Besides, a step may be added to the series of automated steps to remove the flux adhered to the piping connecting face of the connector, but it is not preferable because the production facilities become large in scale and the production cost increases.

SUMMARY OF THE INVENTION

Accordingly, it is an object of the present invention to provide a connector for a heat exchanger to prevent the connector's surface for connection of the piping from being contaminated in the flux shower step for brazing.

The connector for a heat exchanger according to the invention is such that in a heat exchanger comprising a plurality of tubes and fins laminated alternately, header pipes connected to and in communication with both ends of the laminated tubes, the header pipes provided with inlet and outlet connectors to supply and receive a heat exchanging medium to and from an external equipment, and the heat exchanging medium flows to meander a plurality of times between the inlet and outlet connectors, the connector has a groove, which prevents the flux from entering into the inside of the piping connecting face, formed on the rim of a piping connecting face of one of the inlet and outlet connectors which faces downward with respect to a vertical line during brazing.

Accordingly, the flux flowing on the surface during the flux showering is attracted to the groove in the same phenomenon like a surface tension to accumulate in the groove, so that the flux can be prevented from over-flowing into the piping connecting face.

When the flux drops in a large amount, it also flows along the groove to the surface other than the piping connecting face. Thus, the flux can be prevented from over-flowing the groove to enter into the piping connecting face.

BRIEF DESCRIPTION OF THE DRAWINGS

FIG. 10(1) is a side view illustrating a conventional heat exchanger with a connector formed to face upward when the heat exchanger is positioned for brazing; and FIG. 10(2) is a side view illustrating the same as that of FIG. 10(1) except for the connector formed to face downward when the heat exchanger is positioned for brazing.

DESCRIPTION OF THE PREFERRED EMBODIMENT

Now, a first embodiment of the invention will be described with reference to FIGS. 1 through 7.

Figure 1:
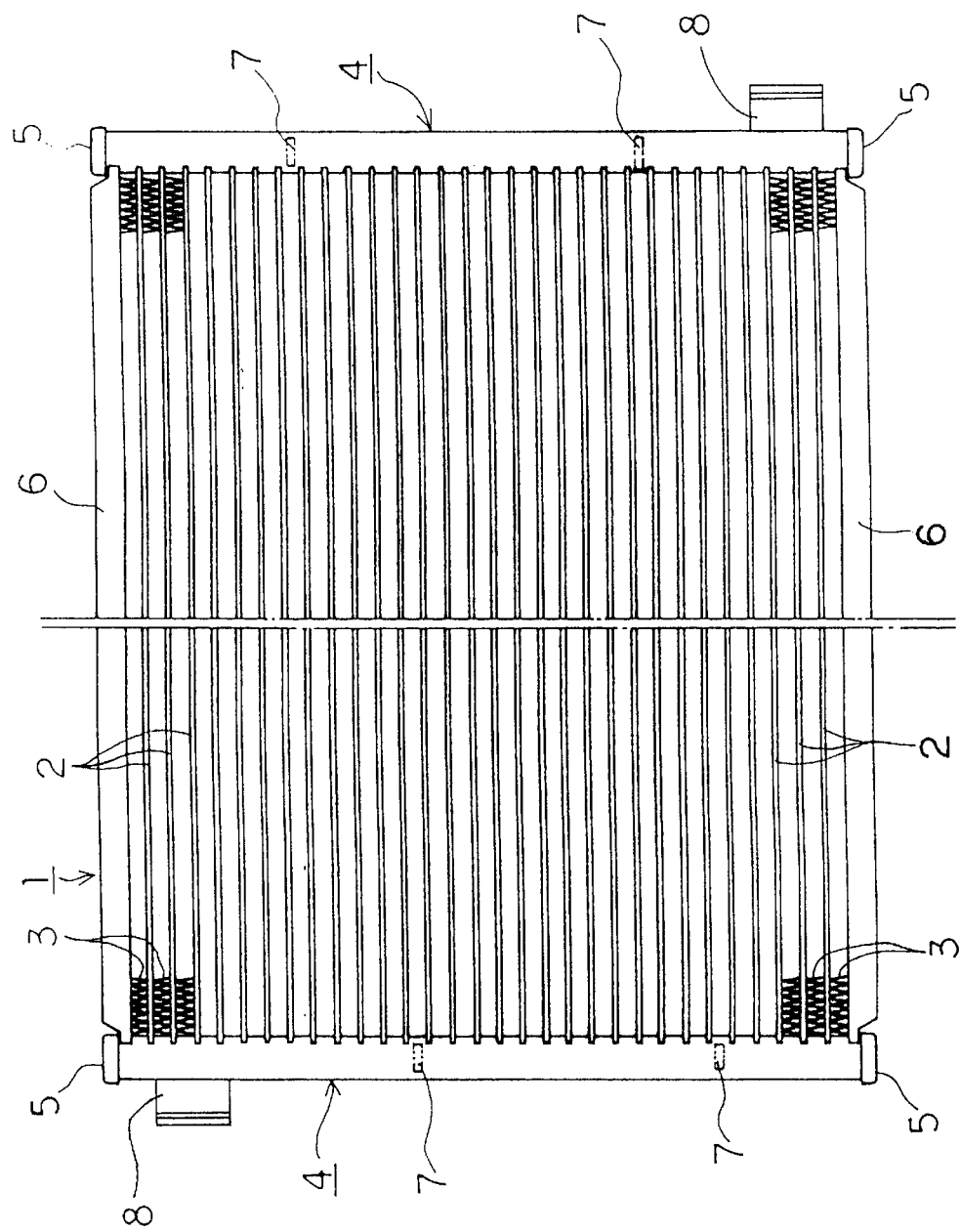
FIG. 1 is a front view of a heat exchanger according to a first embodiment of the invention.
Figure 2:
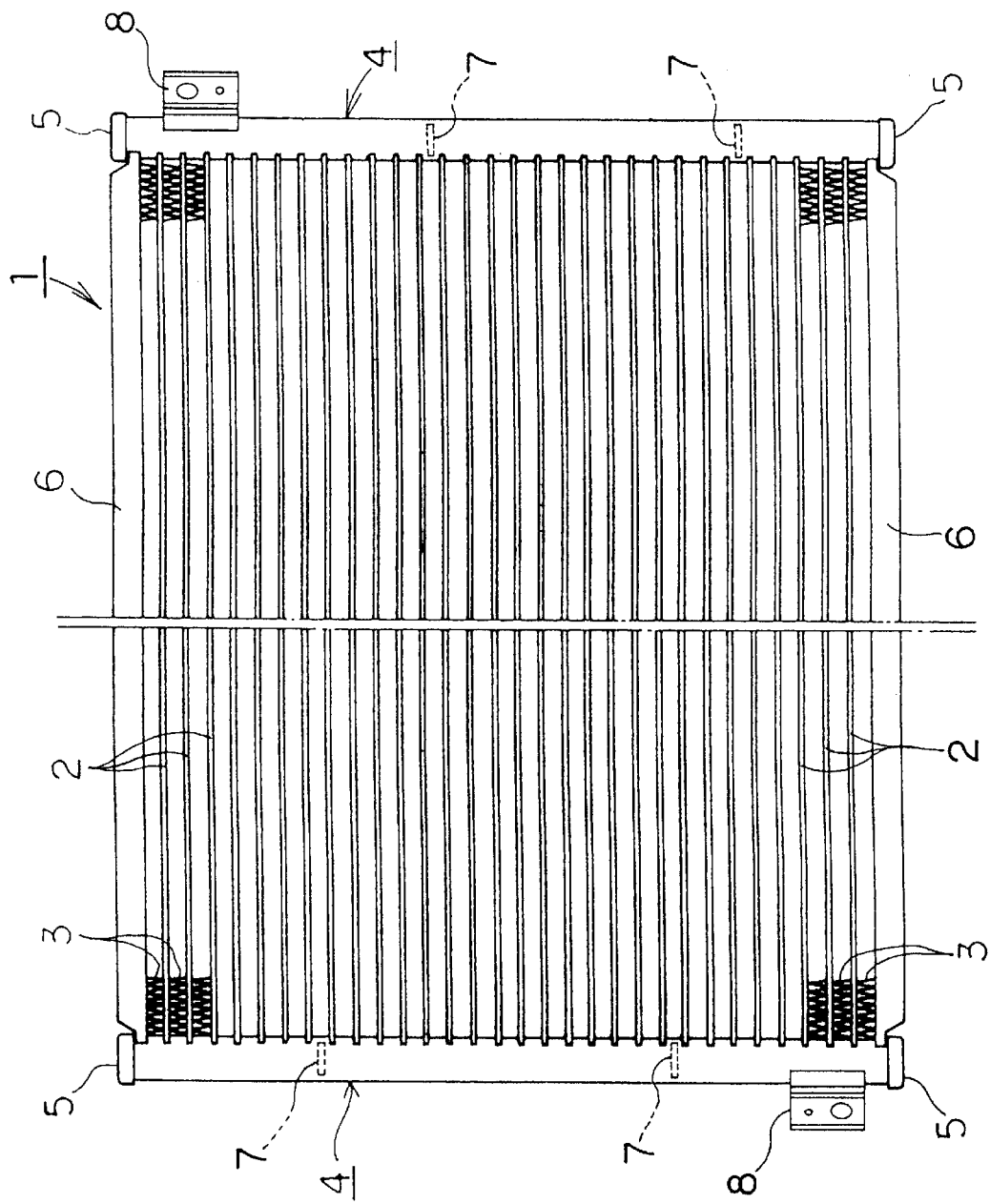
FIG. 2 is a rear view of the heat exchanger according to the first embodiment.

To configure a lamination type heat exchanger 1 of this embodiment, a plurality of flat tubes 2 having the same length are laminated in parallel to one another with a thin corrugated fin 3 interposed between adjacent tubes, and both ends of these flat tubes 2 are connected to and in communication with straight header pipes 4 as shown in FIGS. 1 and 2. And, top and bottom openings of the header pipes 4 are each closed by a blind cap 5, and the inside of each header pipe 4 is divided as predetermined by partitions 7. A connector 8 as an inlet for connection of an external piping and for receiving a heat exchanging medium is connected to communicate with a flowing-in section in the header pipes 4 defined by the partitions 7, and a connector 8 as an outlet for connection of the external piping and for discharging the heat exchanging medium is connected to communicate with a discharge section, and the connectors 8 fixed to the header pipes 4 by brazing.

In FIG. 1, reference number 6 denotes side plates having a frame shape and disposed on the top and bottom of the laminated flat tubes 2 with the corrugated fins 3 interposed. These side plates 6 protect the corrugated fins 3 and also reinforce a structural strength of the heat exchanger 1.

And, the heat exchanging medium which is taken into the heat exchanger 1 through the inlet connector 8 flows to meander a predetermined number of times between the right and left header pipes 4 through the predetermined tubes 2 to make heat exchange with outside while flowing through the tubes and discharged from the outlet connector 8. Specifically, the medium flown into the heat exchanger 1 meanders to flow downward in the heat exchanger 1 through a group unit of a predetermined number of flat tubes 2.

These flat tubes 2 are formed of a thin aluminum material to have the same length and a cross section in a flat oblong shape with mutually parallel flat faces, so that it has predetermined height and width optimum for a heat exchanging efficiency of the medium flowing through the flat tubes 2. And, the respective flat tubes 2 are laminated parallel to one another with the thin corrugated fins 3 interposed between adjacent tubes and their both ends are connected to communicate with the header pipes 4.

Besides, these right and left header pipes 4 are formed of an aluminum material having a predetermined thickness into a long pipe with a cross section having predetermined inner and outer diameters and disposed in an erected state.

These header pipes 4 are also formed by rounding a single thin aluminum brazing sheet as a raw material. And, this brazing sheet is good in heat conductivity, forming property and brazing property, and also used as the raw material for the flat tubes 2 described above.

In addition, the partitions 7 are disposed at predetermined locations in the respective header pipes 4 to prevent the cooling medium from flowing into these locations and to divide each header pipe 4 into a predetermined plurality of divided chambers along the longitudinal direction. Therefore, since predetermined tubes 2 are communicated with these divided chambers as predetermined, the tubes 2 are divided into a predetermined number of tube groups, so that the heat exchanging medium can flow to meander between the right and left header pipes 4.

And, to locations corresponding to the flow-in section and the discharge section of these header pipes 4, the connectors 8 in a substantially block shape are fixed by brazing, and the connectors 8 are connected to the external piping which is communicated with an external equipment.

Figure 3:
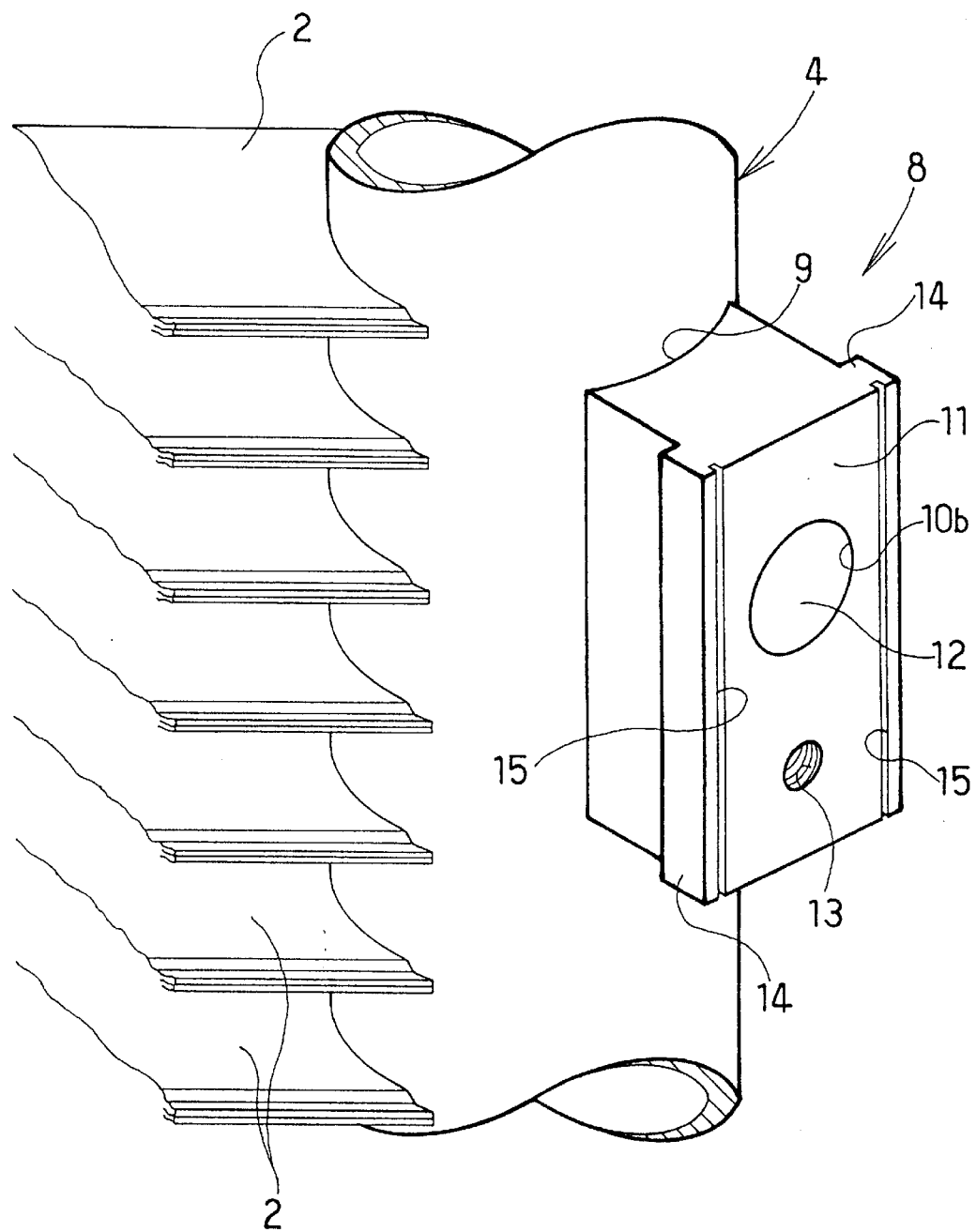
FIG. 3 is a partially enlarged perspective view showing the connector of the heat exchanger of the same embodiment.
Figure 4:
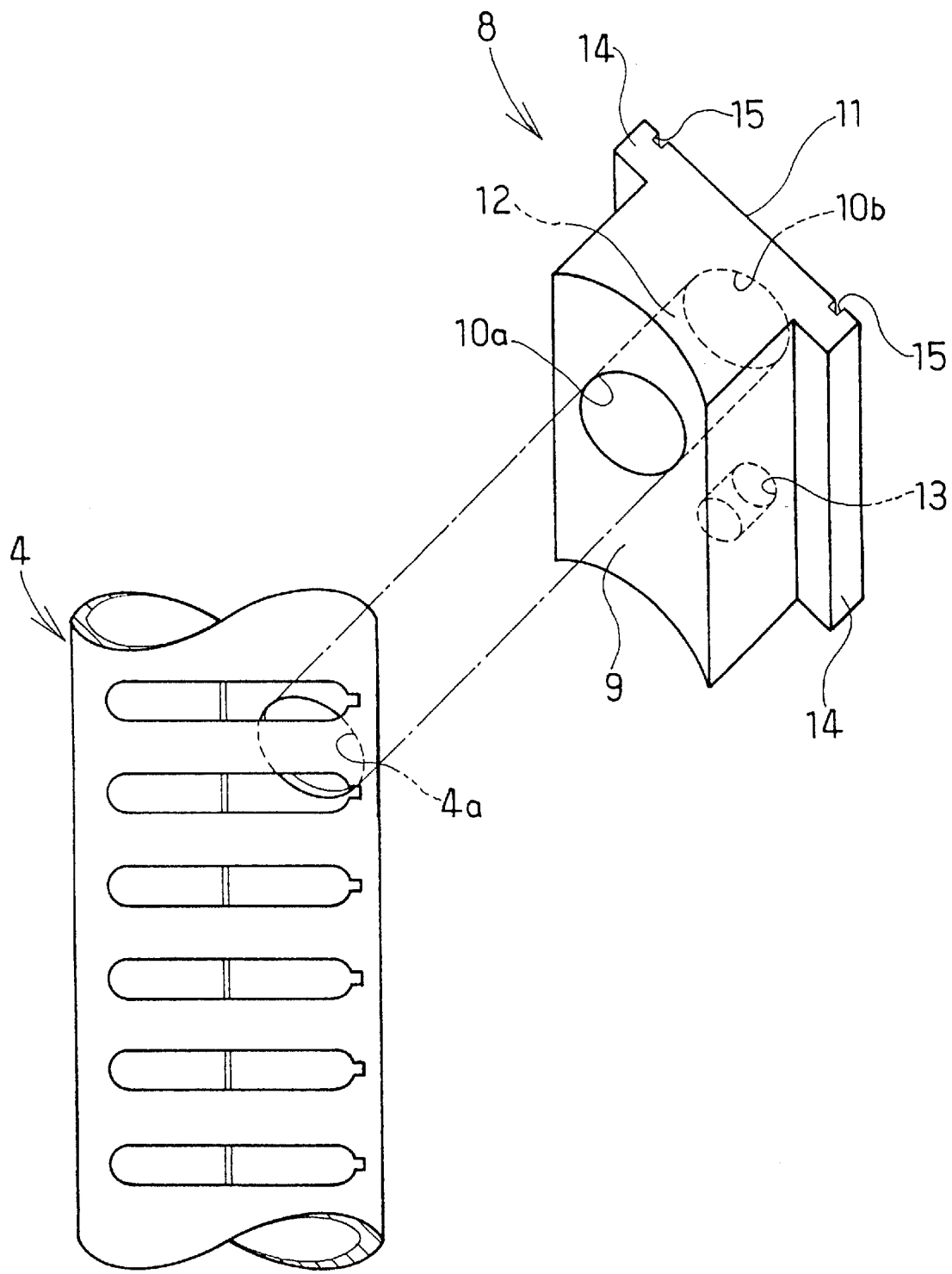
FIG. 4 is an enlarged perspective view showing the header pipe and connector of the same embodiment in a separated form.
Figure 5:
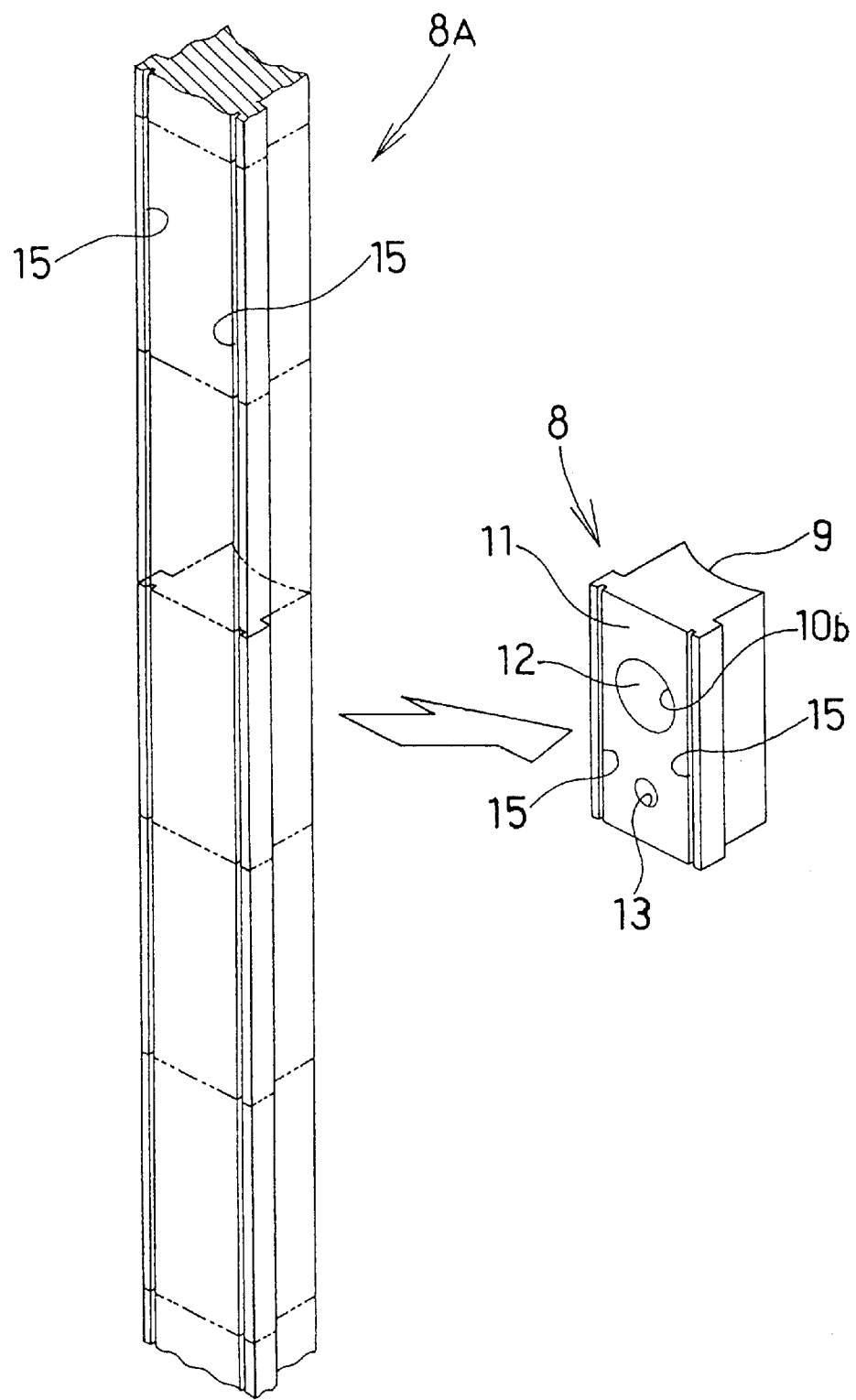
FIG. 5 is a schematic perspective view illustrating a production process of the connector of the same embodiment.

Specifically, as shown in FIGS. 3 and 4, the connectors 8 are formed into a substantially rectangular shape in a vertically disposed state. A connection face 9 which is to be fixed to a predetermined location of the header pipe 4 is formed on one of the vertical surfaces of the connector 8, and a piping connecting face 11 is formed on the other vertical surface opposite to the connection face 9 to connect to the external piping.

This connection face 9 is formed to have a cross section which is an arc shape to conform to the peripheral surface of the header pipe 4 so as to closely adhere to a predetermined location of the header pipe 4.

An opening 10a having the same diameter as a hole 4a, which is formed through the header pipe 4, is formed at substantially the center and upper portion of the connection face 9, and an opening 10b is formed at substantially the center and upper portion of the piping connecting face 11 to correspond to the opening 10a. These openings 10a, 10b are communicated by a communication passage 12 formed in a straight tube through the connector 8, so that the heat exchanging medium is swiftly flown through the communication passage 12.

Thus, by disposing the connection face 9 to adhere closely to the peripheral surface of the header pipe 4, a relatively large brazing area can be provided, and the connector 8 can be fixed firmly to the header pipe 4 by brazing, and airtightness between them can be secured satisfactorily, after completion of brazing.

The piping connecting face 11 formed with a flat face adheres closely to the external piping having an end portion formed to have the same flat face so as to prevent the medium from leaking between the connector 8 and the piping, and to facilitate connection of the piping.

Furthermore, a threaded hole 13 for fixing the piping is formed at substantially the center and lower portion of the piping connecting face 11, and a brim-shaped fitting portion 14 is formed to protrude from both side faces of the piping connecting face 11. This fitting portion 14 is used as an engaging part to mount an inspection tool for inspecting airtightness of the heat exchanger.

In view of a space required for mounting the heat exchanger 1, piping arrangement and others, the heat exchanger 1 of this embodiment is provided with the connector 8 in a direction opposite to the direction in which air flows, namely, along a direction in which air is discharged from the heat exchanger 1. Specifically, the connector 8 is fixed to the header pipe 4 by brazing with the opening 10a, which is formed on the connection face 9, aligned with the through hole 4a in the side of the header pipe 4 to discharge air from the heat exchanger 1, and the connection face 9 adhered closely to the outer circumferential surface of the header pipe 4.

And, a groove 15 is formed on the piping connecting face 11 to prevent the piping connecting face 11 of the connector 8 from being contaminated by the flux dropping during the flux showering step which is included in the production process for the heat exchanger 1.

Specifically, the hole 4a of the header pipe 4 is formed at least not on a location on the outer peripheral surface of the header pipe 4 facing the air flow of the heat exchanger 1, but on other location. Therefore, when the heat exchanger 1 is temporarily assembled and laid down for brazing in the process for producing the heat exchanger 1, the connector 8 is faced down.

The groove 15 is formed on the rims of the piping connecting face 11 in order to prevent the piping connecting face 11 of the connector 8 facing downward from being contaminated by the flux dropping during the flux showering step.

Specifically, the groove 15 is linearly formed adjacent to both side ends and along from the top to bottom ends of the piping connecting face 11 of the connector 8. The grooves 15 are oriented to intersect substantially at right angles with the direction in which the flux is showered when the heat exchanger 1 with the connector 8 assembled temporarily is positioned for brazing.

The connector 8 of this embodiment is formed of an extrusion material similar to construction materials such as an aluminum sash and the groove 15 is also formed during extruding.

Specifically, an extrusion mold which is made of a steel material and has a mold cavity formed into a predetermined inner shape is used. As shown on the left of FIG. 5, an intermediate member 8A having the same cross section is continuously formed into a long shape, it is cut into each connector 8 having a predetermined length, and communication holes (opening 10a, communication passage 12) for flowing the heat exchanging medium and the threaded hole 13 for a fixing screw are formed on the separated connectors 8, as shown on the right of FIG. 5.

By forming projections on predetermined locations of the mold cavity of the extrusion mold, the groove 15 is formed during the extrusion forming, namely, formed when the intermediate member 8A is produced.

The cross sectional shape and depth of the groove 15 are not particularly limited and may be formed into an easily producible shape, e.g., a V groove to prevent the flux flowing on the surface during the flux showering from over-flowing the groove 15.

Figure 6:
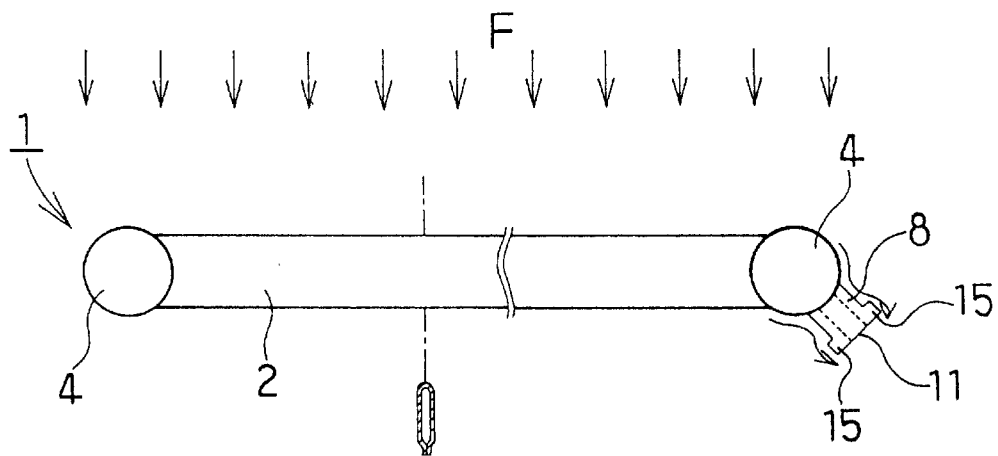
FIG. 6 is a side view illustrating a production step of the heat exchanger of the same embodiment and a state of brazing posture.
Figure 7:
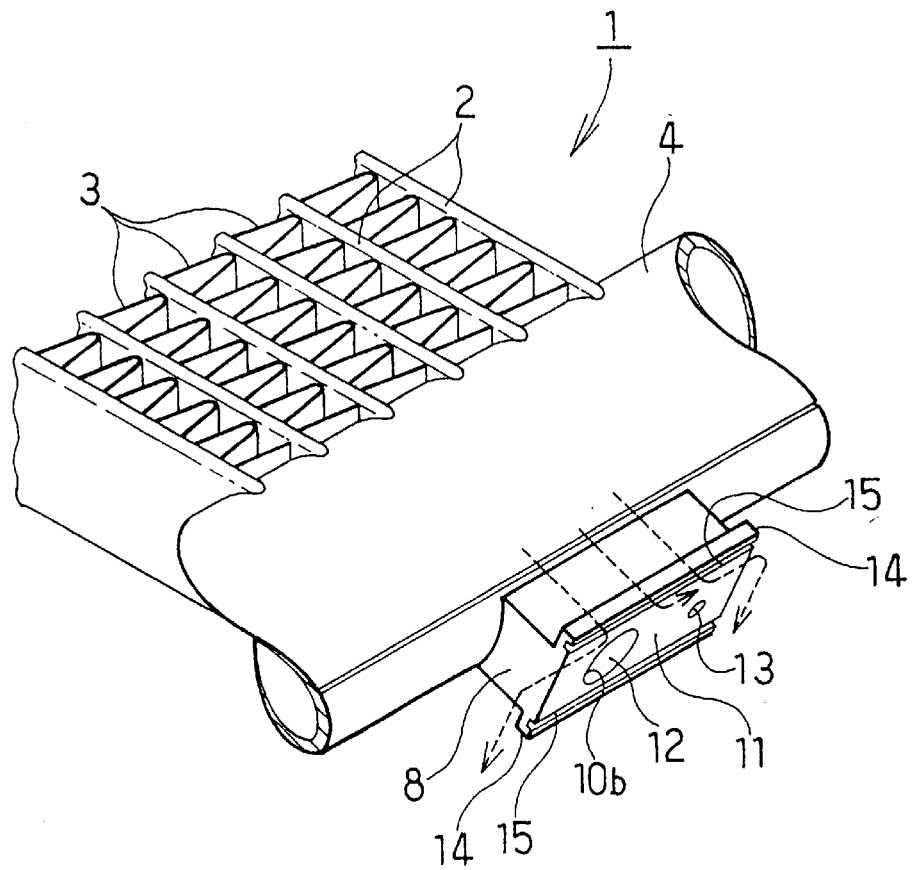
FIG. 7 is a perspective view illustrating the effects of the groove in the same embodiment and showing a state that the flux is prevented from invading into the piping connecting face of the connector during the flux showering.

By forming the groove 15 adjacent to the rims of the piping connecting face 11 of the connector 8 as described above, the flux flowing on the surface during the flux showering is attracted to the groove 15 in the same phenomenon like a surface tension to accumulate in the groove 15, so that the flux is prevented from over-flowing into the piping connecting face 11, as shown in FIGS. 6 and 7.

When the flux drops in a large amount, it also flows along the groove 15 to the surface other than the piping connecting face 11. Thus, the flux can be prevented from over-flowing the groove 15 into the piping connecting face 11.

In this embodiment, one groove is formed in the connector, but a plurality of grooves, e.g., two parallel grooves, may be formed as required to prevent the flux from over-flowing from the grooves into the inside with higher reliability. And, the same can be applied to the following respective embodiments.

In this embodiment, the groove was formed when the connector was produced by the extrusion molding, but it may be formed afterward.

As described above, the groove is previously formed on the piping connecting face of the connector in the direction to intersect at right angles with the direction in which the flux is showered, so that the piping connecting face of the connector can be prevented from being contaminated by the flux during the flux showering process. Thus, piping can be connected securely to the connector, and reliability of piping connection can be improved.

A second embodiment of the invention will be described with reference to FIG. 8.

The connector 8 of this embodiment is designed to protect the piping connecting face and mounting face with higher reliability during the flux showering. The material and shape, openings 10a, 10b and communication passage 12 of the connector 8 will not be described because they have the same structures as those in the first embodiment.

Figure 8:
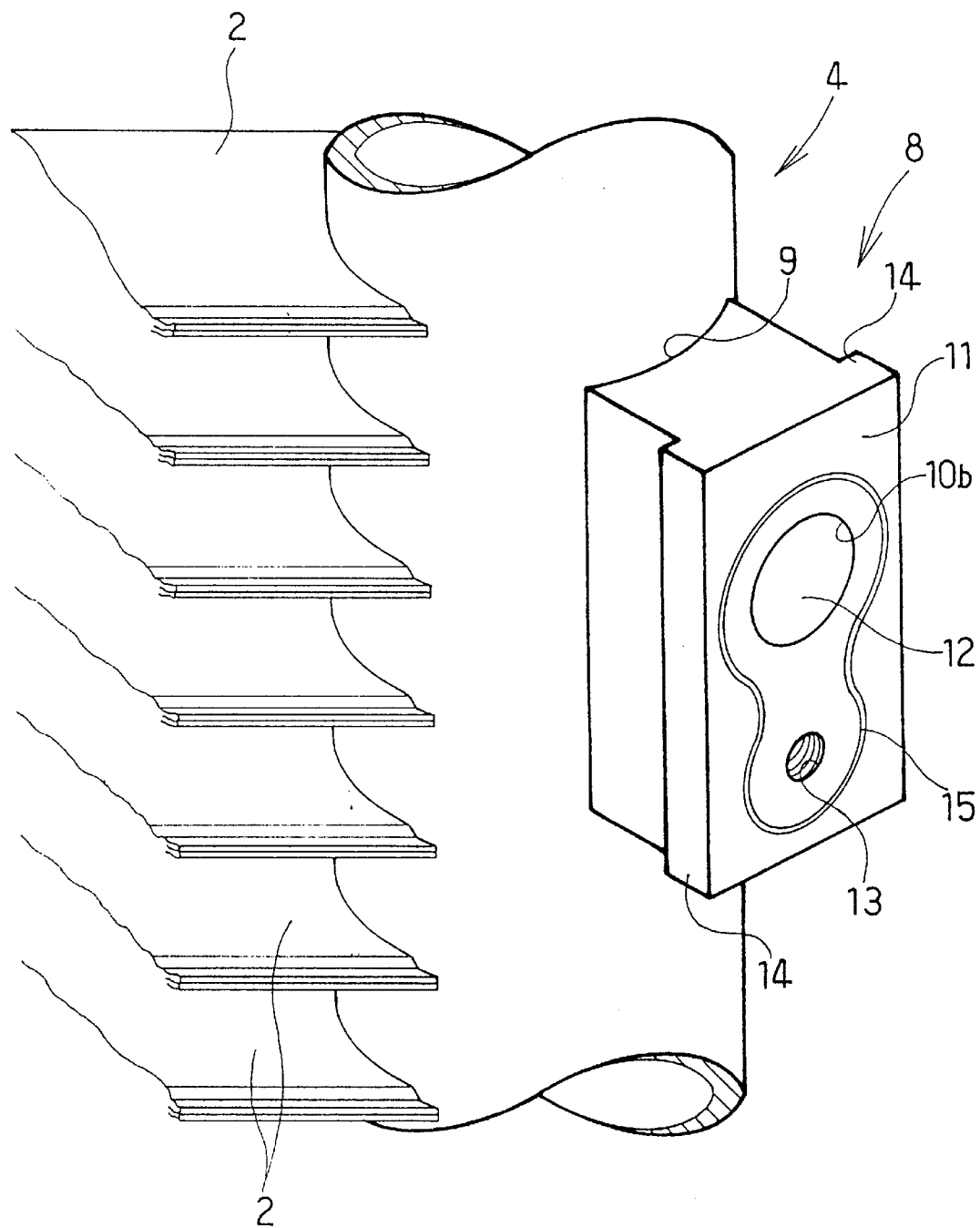
FIG. 8 is a perspective view showing the connector of a second embodiment of the invention.

As shown in FIG. 8, a groove 15 is formed in the piping connecting face 11 to surround the entire periphery of the opening 10b to send and receive the heat exchanging medium and that of the threaded hole 13 for fixing the piping or the like with a predetermined distance away from them. And, this groove 15 is formed by connecting two adjacent circles smoothly. The groove's depth and cross sectional shape are not especially limited so long as they can prevent the flux, which flows along the surface, from over-flowing the groove 15, in the same way as in the first embodiment.

Since the groove 15 is formed to surround the opening 10b (piping connecting opening) and the threaded hole 13 in the piping connecting face 11 of the connector 8, the flux, which flows downward and also in a slanted direction with respect to the downward direction along the surface of the heat exchanger 1 during the flux showering, can be prevented from over-flowing from the groove 15 into the piping connecting face and the threaded hole, so that connection to piping can be secured satisfactorily.

As described above, this embodiment provides the same effects as the previous embodiment. And, since the groove to prevent the flux from invading is formed around the connecting opening for allowing the heat exchanging medium to pass through with a predetermined distance away from it on the piping connecting face of the connector, even if the flux drops in a direction different from the vertical direction during the flux showering in the production process, the flux can be prevented from over-flowing the groove into the inside, and the piping connecting face of the connector can be prevented from being contaminated. Thus, reliability of piping connection can be improved greatly.

The above embodiments have been described in connection with the heat exchanger provided with the connector which is directed downward when the heat exchanger is positioned for brazing. But, the heat exchanger is not limited to them but may have the connector which has only a piping connecting face directed substantially downward to provide the same effects.

Figure 9:
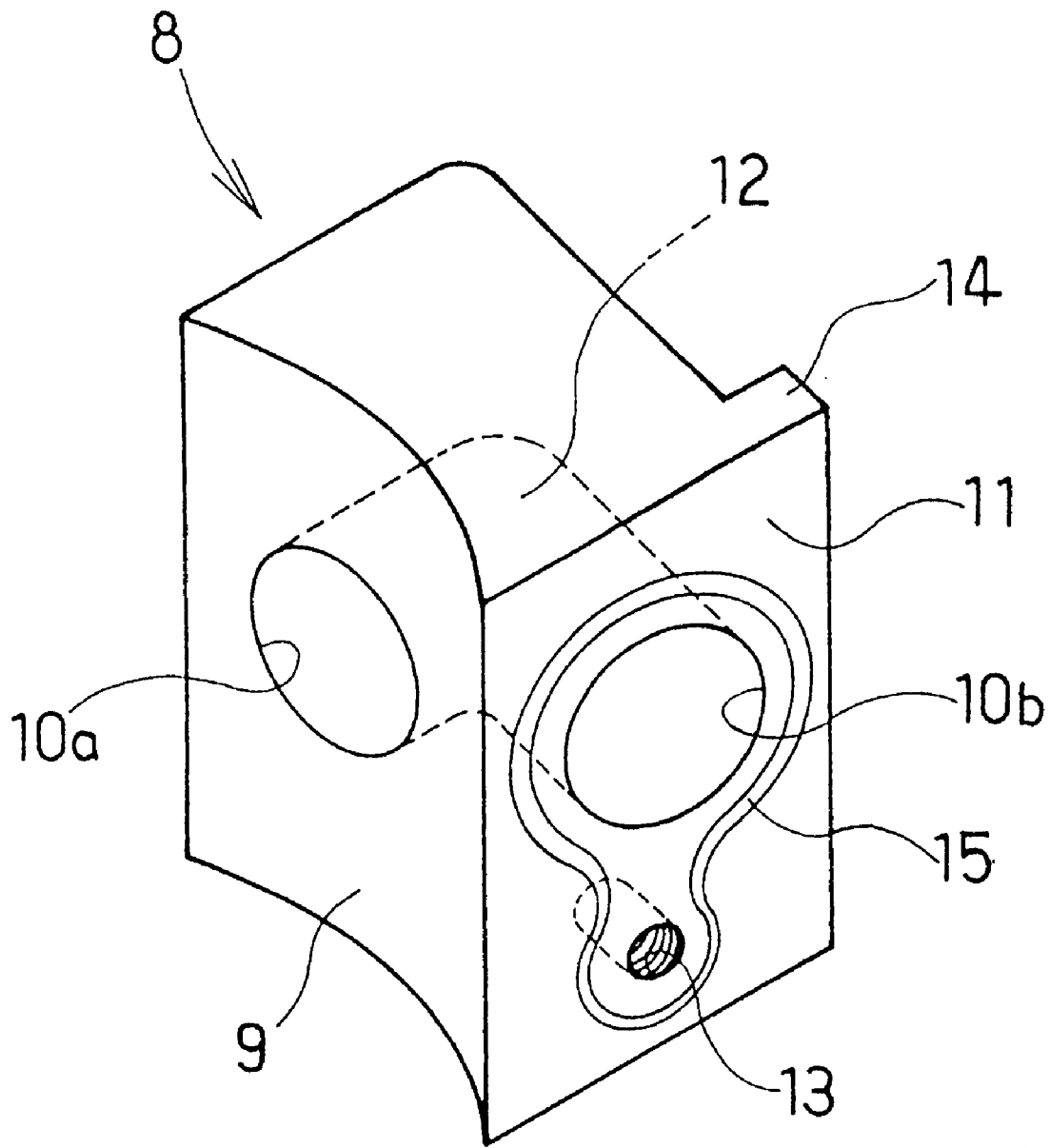
FIG. 9 is a perspective view showing the connector of another embodiment of the invention.

Specifically, as shown in FIG. 9, the connector 8 has the connecting face 9 and the piping connecting face 11 which are related to be orthogonal to each other, and the communication passage 12 is bent at right angles accordingly. And, the header pipes 4 (not shown) of the heat exchanger 1 have, on their faces directed right and left, formed the hole 4a communicated with the opening 10a which is formed in the connecting face 9 of the connector 8.

And, based on the same reasons as in the above embodiments, the connector 8 is fixed to the header pipe 4 by brazing with the piping connecting face 11 of the connector 8 in a direction opposite to the direction in which air flows through the heat exchanger 1, namely, a direction in which air is discharged from the heat exchanger 1, and when the heat exchanger 1 is positioned for brazing, the piping connecting face 11 of the connector 8 is facing downward.

Therefore, by forming the groove 15 in the piping connecting face 11 in the same way as in the previous embodiment, the piping connecting face of the connector can be prevented from being contaminated during the production, so that reliability of connecting the piping can be improved.

What is claimed is:

1. A heat exchanger comprising a plurality of tubes and fins which are alternately laminated, header pipes connected to and in communication with both ends of the laminated tubes, and inlet and outlet connectors connected to the header pipes to supply and receive a heat exchanging medium to and from external equipment, the heat exchanging medium meandering a plurality of times between the inlet and outlet connectors, wherein the axes of the tubes are generally coplanar, the inlet and outlet connectors include inlet and outlet ports extending through the inlet and outlet connectors from a surface connected to the header pipes to a substantially planar piping connecting face, the piping connecting face being disposed at an acute angle greater than 0 and less than 90 degrees relative to the plane in which the tube axes lie and a groove or grooves are formed in the piping connecting face, the groove or grooves at least partially circumscribing and being spaced from the inlet and outlet ports formed through the inlet and outlet connectors to help guide liquid flux solution away from the inlet and outlet ports.

2. A connector for a heat exchanger as recited in claim 1, wherein the groove is linearly formed adjacent to right and left sides and from top to bottom ends of the piping connecting face of the connector, and the linear groove is oriented to intersect substantially at right angles with a direction in which the flux is showered when the heat exchanger with the connector temporarily assembled is placed in a position for brazing.

3. A connector for a heat exchanger as recited in claim 1, wherein the groove is formed to surround the entire circumference of the inlet and outlet port and a threaded hole provided in the piping connecting face of the connector.

\* \* \* \* \*